T. W. MORRELL.
MELTING FURNACE.
APPLICATION FILED JULY 14, 1909.
1,075,592.
Patented Oct. 14, 1913.
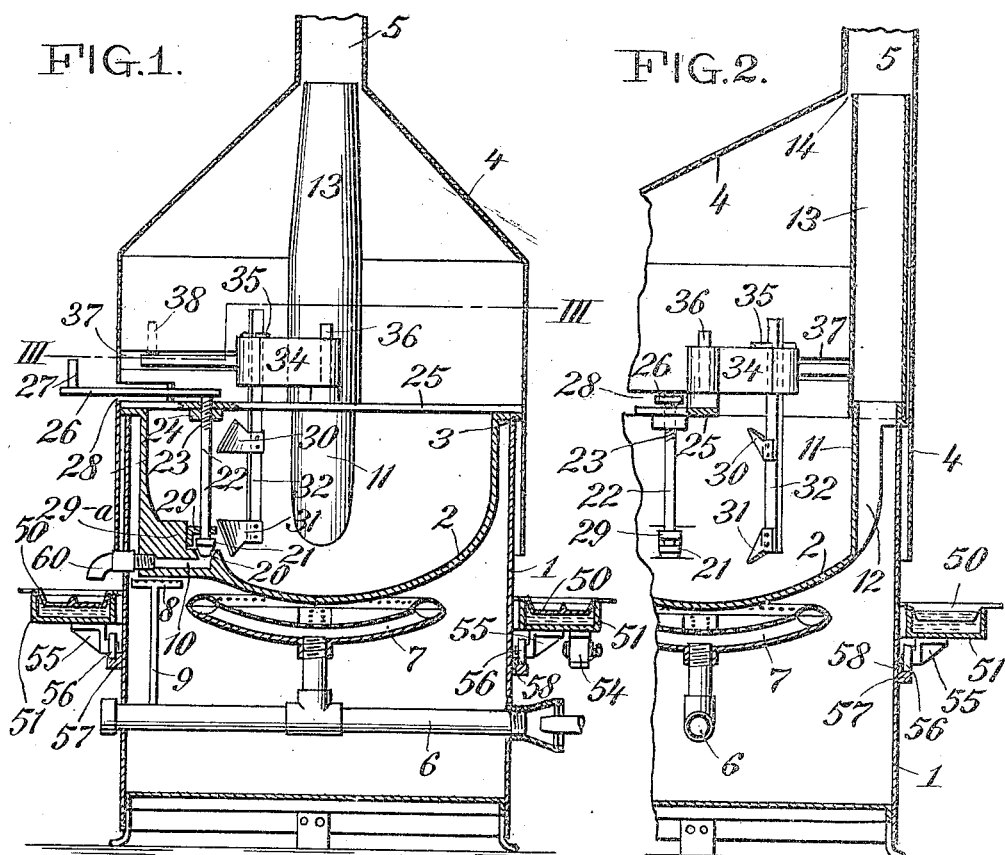
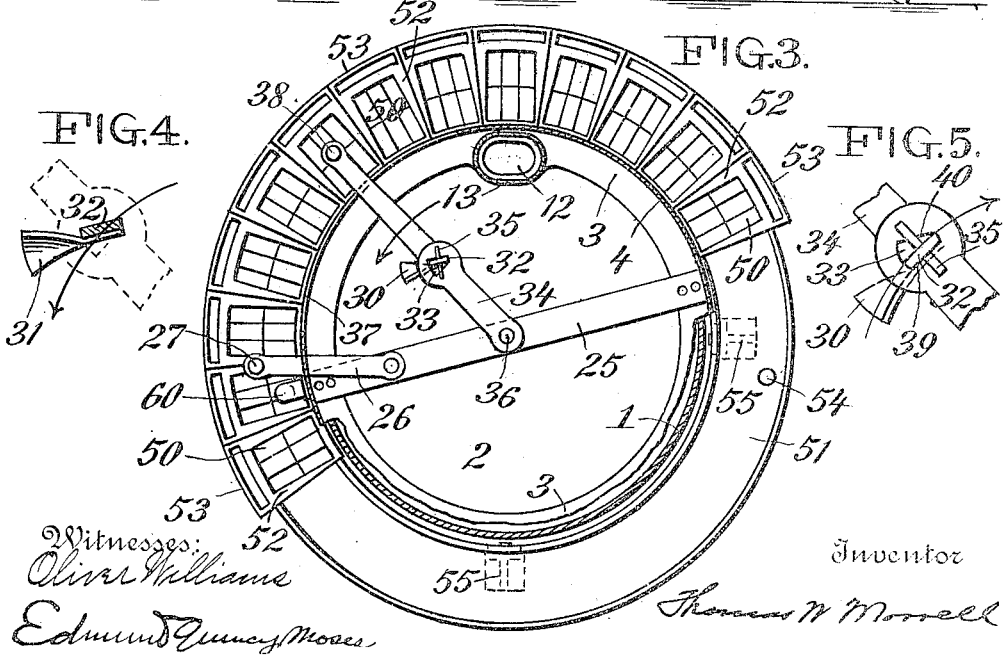
Witnesses:
Oliver Williams
Edmund Quincy Moses
Inventor
Thomas W. Morrell

UNITED STATES PATENT OFFICE.

THOMAS W. MORRELL, OF BLOOMFIELD, NEW JERSEY.

MELTING-FURNACE.

1,075,592.　　　　　Specification of Letters Patent.　　Patented Oct. 14, 1913.

Application filed July 14, 1909. Serial No. 507,496.

*To all whom it may concern:*

Be it known that I, THOMAS W. MORRELL, a citizen of the United States, and a resident of the town of Bloomfield, in the county of Essex and State of New Jersey, have invented certain new and useful Improvements in Melting-Furnaces, of which the following is a specification.

This invention relates to furnaces for melting purposes and particularly to furnaces for use in melting or re-melting metals having a comparatively low fusing point, such as type metal.

Among the objects of my invention is the provision of a furnace in which the metal in the melting pot may be thoroughly stirred and mixed during the melting operation, so as to produce a homogeneous product. I also provide a furnace which is of comparatively low cost, durable, easy to keep in order, and in which are embodied numerous improvements in details of structure.

In the accompanying drawings, which form a part of this specification, I have shown by way of illustration one specific embodiment of my invention, but I do not wish to be limited to the express structure set forth, as numerous modifications may be made therein.

In these drawings Figure 1 is a vertical section of a melting furnace embodying my improvements. Fig. 2 is a partial vertical sectional view taken on a plane approximately at right angles to that of the section shown in Fig. 1. Fig. 3 is a transverse sectional view taken on the line III—III of Fig. 1. Fig. 4 is a detail sectional view through the stirrer bar showing the lower stirrer blade. Fig. 5 is a detail plan view showing a portion of the stirrer arm, the bar and the upper stirrer blade.

Referring to the drawings in detail, the numeral 1 indicates the shell of the furnace in which is supported the melting pot 2. The latter is preferably provided with a flange 3, which rests on the upper edge of the shell. Over the shell and pot is the hood 4, from the apex of which rises the flue 5. I prefer to use gaseous fuel for producing the requisite heat for the melting operation, though other heating means may be used if desired. The gas is introduced through a pipe 6 to a cup shaped burner 7, which produces an even flame over a large surface of the melting pot. A small auxiliary burner 8, supplied from the pipe 6 by a pipe 9, is also preferably provided for heating the outlet passage 10 of the pot, to prevent the freezing of the metal therein. The rear of the melting pot is preferably offset inwardly as at 11, to form a channel 12 for the escape of the products of combustion from the furnace 7, a flue 13 conducting these products to the flue 5. The flue 13 is of slightly smaller diameter than the flue 5, leaving a small annular passage 14 between it and the flue 5, through which the fumes arising from the surface of the metal in the melting pot and collecting in the top of the hood are drawn. The products of combustion from the burner being much hotter than these fumes pass up through the flue 13 with great rapidity and produce an inspirator action at this point. For controlling the outflow of the metal through the passage 10, any suitable form of valve may be used, but I prefer to provide a valve opening 20, in the lower part of the melting pot, closed by a valve 21 mounted on the lower end of a shaft 22. Just above the valve the shaft has a bearing in a guide bracket 29 secured to or forming part of a lug 29$^a$ projecting from the interior of the pot. The upper part of the shaft is threaded as shown at 23, and is supported in a nut 24, carried by a bridge piece 25. A lever 26 provided with a hand grip 27 and secured to the upper end of the shaft 22 serves to rotate the same, and by means of the screw thread on the latter to open and close the valve. A slot 28 is cut in the side of the hood through which the end of this lever projects. The opening in the duct 10 is preferably arranged a slight distance above the bottom of the pot as shown, in order that the impure portions of the metal may be trapped in the bottom of the pot when the pure metal has been withdrawn.

For stirring the metal in the pot I provide a pair of blades 30 and 31, mounted upon a shaft 32, the upper blade being given a downward pitch and the lower one an upward pitch, so that when drawn through the metal the upper blade will tend to force the metal downwardly and the lower one to force it upwardly, both blades at the same time imparting to the metal a rotary motion. The bar 32 passes through a slot 33 in an arm 34, and is loosely supported therein in some suitable manner as by cotter pin 35. The arm 34 is pivoted at 36, to the bridge 25, and its outer end, which extends through a slot 37 in the wall of the hood, is provided with a grip 38. The slot 33 is of wedge shaped section being provided with a face 39, at right angles to the line of the arm 34, and an outwardly inclined face 40. The blade carrying bar 32 is made as thin as possible, being given sufficient strength by enlarging its dimension in the direction of its movement. By reason of its loose suspension in the slot 33 it is permitted to swing from a position against the face 39, to a position against the face 40 and vice versa. It assumes the latter position when the arm is swung in the direction indicated by the arrow in Figs. 3 and 4, this being the active position of the blades 30 and 31. The resistance of the metal against the blades is sufficient to insure its assuming this position. When the arm and blades have been swung in this direction, or forward, as far as desired, the movement is reversed and the arm swung back, or in the direction indicated by the arrow in Fig. 5. The metal then acts upon the rear faces of the blades and causes them to turn into the line of least resistance, the blades and bar then assuming the position shown in Fig. 5. When in the position shown in Fig. 4 and moving forward the blades take hold of the metal firmly and impart to the same a rotary motion, at the same time the upper blade propelling the metal downwardly and the lower blade upwardly as already described. On the return stroke, however, with the blades in the inactive position, they cut through the metal with very little resistance and the rotary motion of the latter is scarcely impeded. A continuous rotary motion in the direction of the arrow shown in Fig. 3 is thus imparted to the metal and the thorough mixing of the same accomplished.

A convenient arrangement for receiving the molten metal from the furnace comprises a series of molds 50, arranged in a continuous annular series about the furnace. In Fig. 3 a portion of these molds are shown, the remainder having been removed. The molds are supported in an annular trough 51 which is preferably filled with water to solidify the metal in the molds more quickly. The exterior of the molds is preferably wedge shaped, the side walls of the latter being thickened toward their outer ends, as shown at 52. The molds may be provided with handles 53 if desired. A cock 54 may be attached to the bottom of the trough 51 for withdrawing the water from the latter. The trough is provided with a series of brackets 55 projecting from its underside and carrying rollers 56 mounted upon a track 57 secured to the exterior of the furnace shell. In this manner the trough and molds may be rotated beneath the spout 60 and the molds successively filled. This track 57 is preferably L-shaped having an upwardly extending flange 58 lying against the outer surface of the furnace shell, which serves to guide the rollers 56 and keep the trough properly centered.

The operation of my furnace will be sufficiently clear from the above description. The metal to be melted is thrown into the melting pot through a suitable opening (not shown) in the hood. When melted, the metal is stirred and its homogeneity insured by oscillating the stirrer arm, bar and blades about the pivot 36. This is a particularly important feature of my invention as the frequent thorough stirring of the metal is essential. With type metal especially, the several ingredients of the alloy have a tendency to separate into strata corresponding to their several specific gravities, unless this tendency is constantly overcome by mechanical means. The metal may be withdrawn through the passage 10 and spout by merely swinging the lever 26 to open the valve. The hand grips 27 and 38 are located sufficiently near together to be readily manipulated by a single operator. As the molds are filled the trough 51 is rotated, bringing the empty molds to position beneath the spout 60. The pigs of metal when solidified may be removed from the molds by simply lifting the latter from the trough by their handles 53 and inverting them.

Having thus described my invention, I claim:

1. In combination, a melting pot, and a stirrer therein, acting to force the upper part of the contents of the pot downwardly and the lower part thereof upwardly.

2. In combination, a melting pot, and a stirrer therein comprising a pair of blades, one of said blades acting to force the contents of the pot upward and the other blade acting to force the same downward.

3. In combination, a melting pot, and a stirrer movable therein including a pair of propeller blades, said blades having opposite pitches.

4. In combination, a melting pot, and a stirrer therein comprising a stirrer bar, blades thereon, and an oscillating arm supported above said pot and carrying said bar.

5. In combination, a melting pot, and a stirrer therein oscillating about a vertical axis, and movable through but a portion of a revolution only.

6. In combination, a melting pot, and a stirrer therein mounted to oscillate through a limited arc about a vertical axis concentric with the pot.

7. In combination, a melting pot, and a stirrer therein, comprising an arm mounted above said pot to oscillate in a horizontal plane, a stirrer bar connected to said arm and depending therefrom, and capable of a limited oscillation with relation to said arm, about a vertical axis.

8. In combination, a melting pot, a bridge piece across the top thereof, an arm pivoted to said bridge piece to oscillate in a horizontal plane, said arm being provided with a slot of wedge shaped section extending vertically therethrough, a stirrer bar loosely mounted in said slot and depending from said arm, and stirring means on said bar causing the same to oscillate about a vertical axis, from a position in contact with one face of said wedge shaped slot, to a position against the opposite face of said slot as the arm is oscillated about its pivot.

9. In combination, a melting pot, an arm pivoted to oscillate in a horizontal plane above the same, said arm having a wedge shaped slot extending vertically therethrough, one face of said slot lying at right angles to the radius of oscillation of said arm, a flat stirrer bar passing through said slot and loosely supported therein and projecting downwardly from said arm, and a stirrer blade projecting from the downwardly extending portion of said bar.

10. In combination, a melting pot, and a stirrer mounted to reciprocate therein, said stirrer offering a greater resistance when moved in one direction through the contents of the pot than when moved in the opposite direction.

11. In combination, a melting pot, and a stirrer reciprocating therein, said stirrer automatically assuming an active position when moved forward and an inactive position when moved rearwardly.

12. In combination, a melting pot and a stirrer mounted to reciprocate therein, said stirrer automatically assuming the position of least resistance when it is moved in a rearward direction.

13. In a melting furnace, in combination, a melting pot and means beneath the same for heating said pot, said pot having a portion offset inwardly at one side thereof to form a flue for the escape of the products of combustion from said heating means.

14. In a melting furnace, in combination, a melting pot, a hood over the same, a flue leading from the upper portion of said hood, a burner beneath said melting pot, and a flue for receiving the products of combustion from said burner, said flue discharging into the lower end of said first mentioned flue and having a slightly smaller diameter than said first mentioned flue, whereby a narrow annular space is left between said flues.

15. In combination, a melting pot, an outlet opening therefrom, a cone shaped valve for closing said opening, a vertical shaft upon the lower end of which said valve is mounted, said shaft being screw threaded at its upper end, a fixed nut with which said screw threaded portion engages, a lever for rotating said shaft, and a hood over said melting pot, said hood being provided with a slot through which said lever projects.

16. In combination, a melting pot, and a stirrer therein comprising a stirrer-bar, propeller blades thereon having opposite pitches, and an oscillating arm supported above said pot and carrying said bar.

17. In combination, a melting pot, and a stirrer therein comprising a stirrer-bar mounted to oscillate through a limited arc about a vertical axis concentric with the pot, and a pair of blades on said bar acting to force the upper part of the contents of the pot downwardly, and the lower part thereof upwardly.

THOMAS W. MORRELL.

Witnesses:
   Edmund Quincy Moses,
   Oliver Williams.